United States Patent
Knox et al.

(10) Patent No.: US 8,757,947 B2
(45) Date of Patent: Jun. 24, 2014

(54) SAFETY NET ASSEMBLY FOR OPENING IN A CARGO TRAILER

(75) Inventors: Howard T. Knox, Independence, KY (US); Edward K. Saunders, Erlanger, KY (US); Jerry Squyres, Point, TX (US)

(73) Assignee: Ancra International, LLC, Azusa, CA (US)

( * ) Notice: Subject to any disclaimer, the term of this patent is extended or adjusted under 35 U.S.C. 154(b) by 0 days.

(21) Appl. No.: 13/553,020

(22) Filed: Jul. 19, 2012

(65) Prior Publication Data

US 2013/0064620 A1    Mar. 14, 2013

Related U.S. Application Data

(60) Provisional application No. 61/510,764, filed on Jul. 22, 2011.

(51) Int. Cl.
 *B60P 7/08*    (2006.01)
(52) U.S. Cl.
 USPC .............................. 410/118; 410/130; 410/135
(58) Field of Classification Search
 USPC ............ 410/96, 97, 117, 118, 129, 130, 132, 410/135, 139; 244/118.1; 87/2, 12
 See application file for complete search history.

(56) References Cited

U.S. PATENT DOCUMENTS

| | | | |
|---|---|---|---|
| 5,288,122 A * | 2/1994 | Pilhall | |
| 6,074,143 A | 6/2000 | Langston et al. | |
| 6,364,583 B1 | 4/2002 | Koller | |
| 6,895,867 B1 | 5/2005 | Burrows | |
| 7,008,154 B1 * | 3/2006 | Nolle | 410/118 |

* cited by examiner

*Primary Examiner* — Stephen Gordon
(74) *Attorney, Agent, or Firm* — Brinks Gilson & Lione

(57) ABSTRACT

A safety net assembly for selectively blocking and exposing an opening in a cargo container having a wall assembly bounding a storage space. A flexible net is selectively placed in: i) a first state wherein the net spans a substantial height and width of an access opening; and ii) a second state wherein the opening is further exposed. In the first state, the net has a first length between spaced first and second locations that spans a width portion of the opening along a horizontal line at a first height. The net is extensible to allow the first location on the net to be lowered while maintaining the second location on the net at the first height so that the line between the first and second locations is angled from horizontal and has a second length between the first and second locations that is greater than the first length.

20 Claims, 4 Drawing Sheets

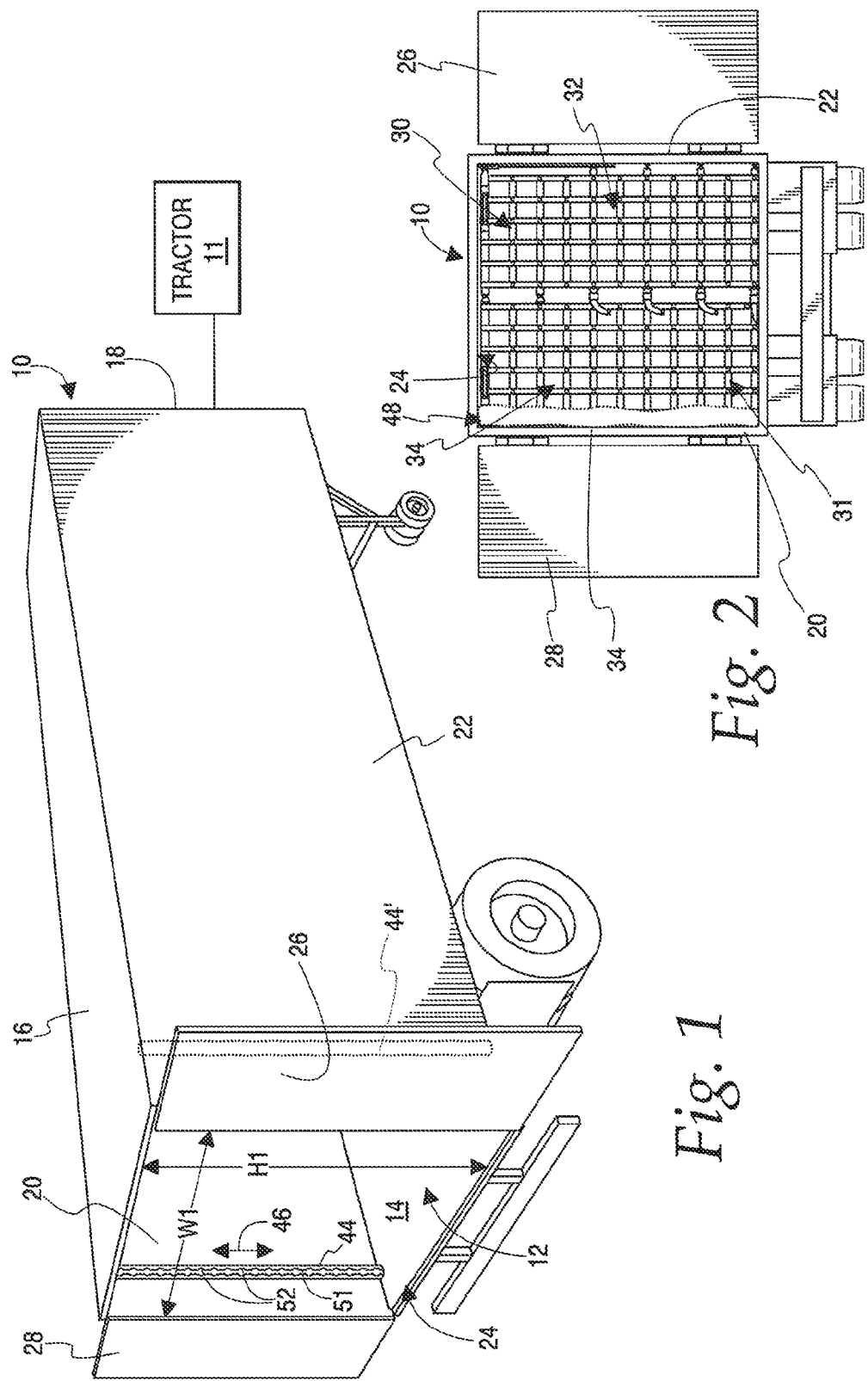

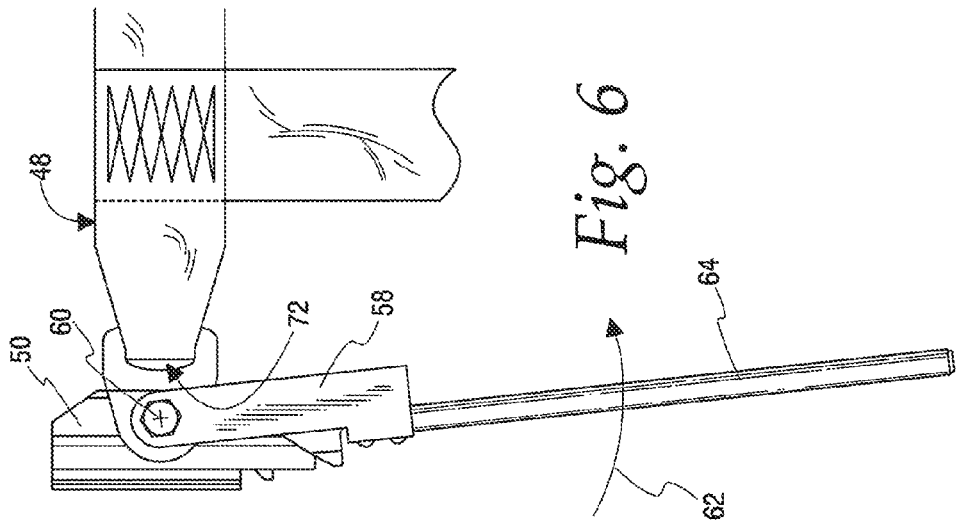
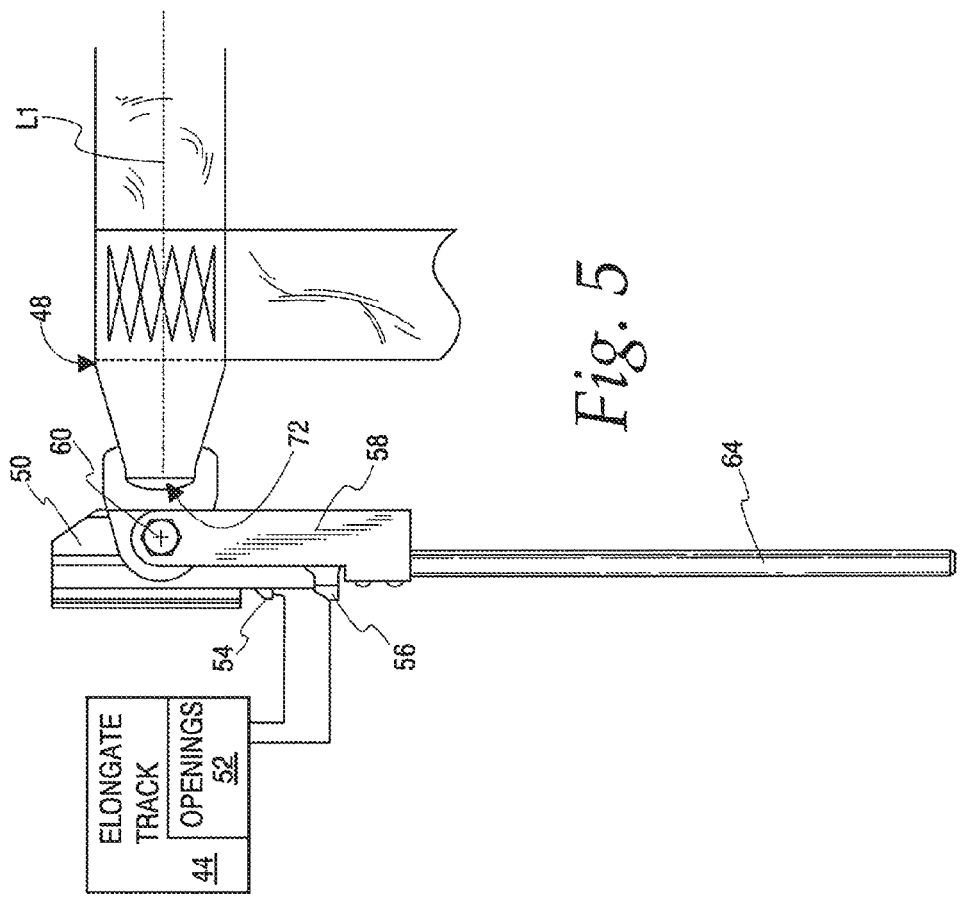

SAFETY NET ASSEMBLY FOR OPENING IN A CARGO TRAILER

CROSS-REFERENCE TO RELATED APPLICATIONS

This application is a non-provisional of U.S. Ser. No. 61/510,764 filed Jul. 22, 2011.

BACKGROUND OF THE INVENTION

1. Field of the Invention

This invention relates to cargo carrying trailers and, more particularly, to a safety net assembly that is utilized to restrain cargo when the main cargo doors are opened.

2. Background Art

Cargo carrying trailers, such as on tractor-trailers, are made with a cubicle cargo storage space. Typically, cargo will be loaded progressively from front to rear through a rear opening that is selectively blocked by hinged doors.

Transportation of cargo is most efficient when all of the cargo space is utilized. Typically, the cargo will be loaded right up to the rear trailer opening. The cargo will be confined by the main cargo doors during vehicle movement. When cargo is to be unloaded at its destination, the process is initiated by opening the rear doors. Cargo that has shifted may be precariously situated and tend to tip out of the rear opening once the doors are opened. To avoid this condition, and reduce the likelihood of physical injury to personnel and/or damage to the cargo, it is known to restrain cargo by incorporating a flexible safety net.

Typically, the safety nets are made from flexible material that will span the entire area of the rear opening to confine any cargo, regardless of its stacked height. In a typical trailer construction, the height of the opening will be approximately 110" above the floor. Thus, the safety net generally extends upwards from the floor that same distance.

Heretofore, safety net systems have been installed using different techniques and mechanisms. In one oft-used system, vertical tracks are mounted on the trailer side walls. A number of conventional fittings exist that can be locked onto the tracks to secure the net at spaced vertical locations, including a location adjacent the trailer roof.

Typically, the net will be made with at least two parts that are releasably joined at a vertical parting line that is at a mid-width location. Cooperating hook components are commonly used at spaced vertical locations on the net parts and are manually connected and disconnected by those securing and unloading the cargo. Ideally, to maintain the integrity of the safety net over its entire vertical extent, the cooperating hook components engage at or adjacent to the top of the safety net. To open the safety net, the user releases the hook components, whereupon the parts are separable and can be folded towards their respective sides. It is impractical for an individual of normal height to conveniently access the topmost hook components while standing on the trailer floor. The industry has come up with different mechanisms to facilitate access to these upper hook components.

As one example, a vertically adjustable, horizontal beam has been used as a safety net support. The beam has ends that cooperate with the tracks and is capable of being vertically adjusted to selectively raise and lower the top of the net. At the cargo destination, the entire beam can be lowered, while maintaining a horizontal orientation, to allow the net parts to be readily released from each other at the parting line by an individual standing on the trailer floor.

In this design, the beam is stored at the ceiling level, with the released safety net parts pushed oppositely to the sides of the trailer to be out of the path of cargo that is loaded or unloaded. One drawback with this design is that the beam for the net at all times extends down below the overhead structural beam at the rear opening. This reduces the effective cross-sectional area of the rear opening. The beam thus presents a possible obstruction to loading and unloading of cargo. The assignee herein currently offers such a product as its Ancra Lift-A-Deck® system.

As an alternative, the cross beam can be eliminated and the top corners of the safety net secured using lockable fittings offered by the assignee in another form of its Lift-A-Deck® system, as shown in assignee's U.S. Pat. No. 6,074,143. While the safety net is not shown in this patent, the vertical track and cooperating fittings guided vertically therein are usable, without the beam, to secure the safety net corners at selected heights potentially fully between the floor and ceiling as at the rear of the cargo space. Once the safety net parts are lowered and thereafter separated and shifted to their respective sides, the rear opening is unobstructed, as by a beam in the previously described design. However, this design requires the initial first step of simultaneous downward shifting of both upper corners of the safety net. Otherwise, if only one corner were to be lowered, the upper edge of the safety net would be required to tilt to a diagonal orientation. Since the width dimension of the upper edge of the net is substantially fixed, this diagonal orientation could not be achieved to an extent that would lower the uppermost hook components to a height that they might conveniently be reached.

In spite of an industry awareness of these problems, the problems have persisted since no commercially viable solutions are currently available.

SUMMARY OF THE INVENTION

In one form, the invention is directed to a safety net assembly for selectively blocking and exposing an opening in a cargo container having a wall assembly bounding a storage space. The wall assembly includes: a) a peripheral wall structure with spaced side walls; b) a top wall; and c) a floor. An opening is provided in the peripheral wall structure and has a width and a height. The safety net assembly consists of a flexible net that is selectively placed in: i) a first operative state wherein the flexible net spans a substantial height and width of the opening to strategically block the opening so as to confine cargo within the storage space; and ii) a second, opened state wherein the opening is exposed to a greater extent than with the flexible net in the first operative state to allow cargo to be directed through the opening into and from the cargo space. With the flexible net in the first operative state, the flexible net has a first length between spaced first and second locations on the flexible net that spans a width portion of the opening along a horizontal line at a first height. The flexible net is extensible to allow the first location on the flexible net to be lowered while maintaining the second location on the flexible net at the first height so that the line between the first and second locations is angled from horizontal and has a second length between the first and second locations that is greater than the first length as the flexible net is transitioned to the second, opened state.

In one form, the flexible net has at least first and second collapsible parts. With the flexible net in the first operative state, the first and second collapsible parts cooperatively span a widthwise extent of the opening. With the flexible net in the second, opened state, the first and second collapsible parts are moved away from each other in a widthwise direction relative to the opening.

In one form, with the flexible net in the first operative state the first and second collapsible parts cooperatively cover substantially the full height and width of the opening.

In one form, the safety net assembly further includes a first elongate track that has a length and is mounted to the peripheral wall structure so that the first elongate track length is aligned in a vertical direction. A first shoe is guided by the first elongate track and is selectively movable to different locations along the length of the first elongate track. The first location on the safety net is on the first collapsible part and is connected to the shoe.

In one form, the first elongate track is on one of the spaced side walls and the second location on the flexible net is on the second collapsible part and is connected to the other of the side walls.

In one form, the flexible net is locally extensible and the safety net assembly has an extensible element on the flexible net that reconfigures to allow the length between the first and second locations to change.

In one form, the extensible element is a coil spring.

In one form, the safety net assembly further includes a coil spring spanning a distance along the horizontal line on one of the first and second collapsible parts with the flexible net in the first operative state. The coil spring is reconfigurable to allow the length between the first and second locations to change.

In one form, the first and second collapsible parts are releasably joined along a vertical parting line.

In one form, the first and second collapsible parts are joined to each other using cooperating hook components.

In one form, the cooperating hook components can be hand connected and separated from each other by a user without requiring tools or separate fasteners.

In one form, the safety net assembly has a second elongate track that has a length and is mounted to the peripheral wall structure so that the second elongate track length is aligned in a vertical direction. A second shoe is guided by the second elongate track and is selectively movable to different locations along the length of the second elongate track. The second location on the safety net is on the second collapsible part and is connected to the second shoe.

In one form, the first elongate track is on one of the spaced side walls and the second elongate track is on the other of the spaced side walls.

In one form, an actuator is provided on the shoe and is movable to thereby change the shoe between locked and unlocked states.

In one form, the actuator has an arm that is pivotable around an axis to change the shoe between the locked and unlocked states.

In one form, the arm has an elongate extension rod that depends from the shoe and is graspable by a user and movable to pivot the arm.

In one form, one of the collapsible parts is fixed to the peripheral wall structure at a plurality of vertically spaced locations.

In one form, the flexible net consists of a plurality of flexible elongate straps joined together in crossing relationship.

In one form, the invention is further directed to a method of using a safety net assembly as described above. The method consists of the steps of: a) with the flexible net in the first operative state, one of: i) lowering the first location on the flexible net while maintaining the second location on the flexible net at the first height; and ii) lowering both the first and second locations on the flexible net; and b) after performing step a), reconfiguring the flexible net to facilitate passage of cargo into the storage space and from the storage space through the opening.

In one form, the step of lowering one or both of the first and second locations on the flexible net involves lowering one or both of the first and second locations on the flexible net to a height spaced above the floor a first distance over one half the height of the opening. The step of reconfiguring the flexible net involves reconfiguring the flexible net with one or both of the first and second locations on the flexible net spaced the first distance above the floor.

In one form, the step of reconfiguring the flexible net involves moving one part of the flexible net away from another part of the flexible net at a parting line.

BRIEF DESCRIPTION OF THE DRAWINGS

FIG. 1 is a perspective view of one form of cargo container, in the form of a trailer, into which the inventive safety net assembly can be incorporated;

FIG. 2 is a rear elevation view of the cargo container/trailer in FIG. 1 and showing the inventive safety net assembly operatively connected and with separate parts thereon in an operative state;

FIG. 5 is an enlarged, fragmentary, end view of a mechanism through which an upper corner of the safety net can be guidingly raised and lowered and with a shoe thereon in a locked state;

FIG. 6 is a view as in FIG. 5 wherein the arm is repositioned to an unlocked state;

DETAILED DESCRIPTION OF THE PREFERRED EMBODIMENT

Figure 4:
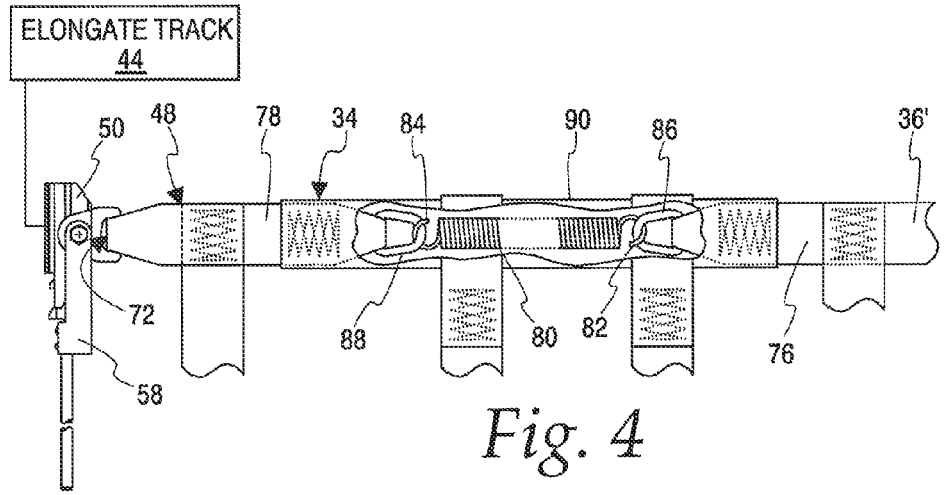
FIG. 4 is an enlarged, fragmentary, end view of a portion of the safety net within the oval shape in FIG. 3 and partially broken away to show a coil spring that is incorporated into the safety net to allow effective lengthening of a horizontally extending strap thereon.

In FIGS. 1 and 2, a cargo container, suitable for incorporation of the present invention, is shown at 10. The cargo container 10 may have any of virtually an unlimited number of different designs. In this case, the cargo container 10 is shown as a trailer that is typically drawn by a tractor 11 and referred to as part of a tractor-trailer construction.

The trailer 10 has a generally cubicle cargo storage space at 12 bounded by a wall assembly consisting of a floor 14, a top wall 16, a front wall 18, and spaced side walls 20, 22. The front wall 18 and spaced side walls 20, 22 define a peripheral wall structure.

An access opening 24 is provided in the peripheral wall structure at the rear of the trailer 10. The access opening 24 is selectively blocked by a pair of hinged doors 26, 28. The doors 26, 28 are shown in an open state in FIGS. 1 and 2, wherein the access opening 24 is substantially unobstructed by the doors 26, 28.

As the doors 26, 28 are opened, as for example at a destination/unloading location, in the absence of some additional structure, loose cargo, that has migrated rearwardly into the rear portion of the storage space 12 and is unconfined, might fall through the access opening 24. This is particularly a problem at destination locations after the cargo container 10 has been moved over terrain that may cause the cargo to shift from its originally stored state and become unbalanced. As noted in the Background portion herein, it is known to use a safety net to confine cargo at the access opening 24. The present invention is directed to a safety net assembly, as shown at 30 in FIGS. 2-6, strategically spanning at least a portion, and preferably substantially the entirety, of the area of the access opening 24.

The safety net assembly 30 consists of a flexible net 31 made up of at least first and second collapsible parts 32, 34. Each of the parts 32, 34 has the same general shape and construction. Exemplary part 32 has a fully extended height H substantially matched to the height H1 (FIG. 1) of the access opening 24 and a fully extended width W equal to approximately one-half of the width W1 (FIG. 1) of the access opening 24.

The part 32 is defined by horizontal and vertical flexible, elongate strap lengths 36, 38, respectively, sewn together in crossing relationship to produce a generally square grid pattern. It is known in those industries in which safety nets are utilized to sew strap material in this arrangement to confine cargo. The precise nature of the strap material is not critical to the present invention and its selection would be readily made by one skilled in the art based upon the particular application.

The net part 32 has a series of hook components 40 each vertically aligned to mate with a complementary and cooperating hook component 42 on the collapsible part 34. The hook components 40, 42 are hand operable and can be joined together at a vertical parting line PL and released to separate the parts 32, 34. Handholds 43 are provided on the bottom four hook components 42 to facilitate controlled movement of the hook components 42 as they are both connected and released. Hand connection and separation is facilitated, with the cooperating hook components 40, 42 operable without requiring tools or separate fasteners. In this design, six cooperating hook component pairs are shown at equally spaced vertical locations, including one at the top of the safety net assembly 30. With the hook parts 40, 42 connected, the integrity of the safety net 31 is maintained across its entire areal extent.

The safety net assembly 30 may have more than the two parts 32, 34 shown to span the access opening 24 or be made as one part, as described hereinbelow. Regardless of the number of parts utilized, the at least first and second collapsible parts 32, 34 are designed to be selectively placed in: a) a first operative state wherein the at least first and second collapsible parts 32, 34 span between the spaced side walls 20, 22, as shown in FIG. 2 to block the opening 24 so as to confine cargo in the space 12; and b) a second, opened state wherein the first and second collapsible parts 32, 34 are moved away from each other to expose a greater extent of the opening 24 to thereby allow cargo to be directed through the opening 24 into and from the cargo space 12.

More particularly, in this latter state, the first part 32 can be folded towards the side wall 22, with the part 34 folded against the side wall 20. The part 34 is shown in dotted lines folded against the side wall 20 in FIG. 2. The flexible nature of the safety net 31 facilitates the compact stowing of the parts 32, 34 at or adjacent their respective side walls 22, 24 with minimal projection that might otherwise obstruct movement of cargo through the access opening 24.

The safety net assembly 30 further includes a first elongate track 44 that has a length and is mounted to the sidewall 20 so that its length L, indicated by the double-headed arrow 46 in FIG. 1, is aligned in a vertical direction.

An upper portion 48 of the safety net 31, defined by the part 34, is connected to a guide shoe 50 that cooperates with the elongate track 44 so as to be guided vertically therealong in a substantially straight translational path. One exemplary and suitable design for the cooperating elongate track and shoe is shown in assignee's U.S. Pat. No. 6,074,143, to Langston et al, incorporated herein by reference. It suffices to say that there should be at least one vertically extending slot 51 to cooperate with a guide rail, with these components being one each on the elongate track 44 and shoe 50.

The elongate track 44 has vertically spaced openings 52 which receive lugs 54, 56, attached to an actuator/arm 58 that is pivotably connected to the shoe 50 for movement around a horizontal axis 60 to change the shoe 50 between locked and unlocked states. In FIG. 5, the arm 58 is situated to direct the lugs 54, 56 into a pair of openings 52 on the elongate track 44, representing the locked state for the shoe 50. This sets and maintains the vertical height of the shoe 50. By providing openings 52 at spaced intervals along the height of the elongate track 44, the shoe 50 can be selectively releasably maintained in a range of different vertical positions.

By pivoting the arm 58 in the direction of the arrow 62 around the axis 60, the lugs 54, 56 can be drawn out of the openings 52, thereby placing the shoe in the unlocked state and permitting the shoe 50 to slide freely upwardly and downwardly guided by the elongate track 44.

A similar guide shoe 50' with an arm 58' cooperates with an elongate track 44' on the side wall 22. The interaction of these corresponding components is the same on each of the side walls 20, 22. The shoe 50' is connected to the opposite upper location/corner portion 48' of the safety net 31, defined by the part 32.

The arms 58, 58' respectively have elongate extension rods 64, 64' depending therefrom to allow the arms 58, 58' to be pivoted therethrough by grasping the rods 64, 64' at a location approximately mid-height upon the safety net 31.

To install the safety net 31, a series of fasteners 66, 68 is provided at spaced vertical locations upon the sides of the parts 32, 34, respectively. The fasteners 66, 68 can take any of a number of different forms and are designed to be connected releasably, or more permanently, to the side walls 20, 22 through the elongate tracks 44, 44', or otherwise. The depicted group of the uppermost fasteners 66, 68 on each of the parts 32, 34 resides slightly above the mid-height location for each of the parts 32, 34 to be conveniently accessible to an individual standing on the floor 14.

The shoes 50, 50' are slid upwardly to lock the safety net 31 in place so that an upper edge 69 resides at or adjacent to the roof 16 at the access opening 24.

With the first and second collapsible parts 32; 34 in their first operative states, they together span between the side walls 20, 22. In this state, the safety net 31 has a first horizontal dimension HD along a first line L1 between spaced upper locations 72, 74 of the safety net 31 where the safety net 31 connects to the shoes 50, 50'.

The collapsible part 34 is made to be locally extensible near the location 72, which is on the uppermost horizontal strap 36a on the collapsible part 34. This strap 36a, as seen most clearly in FIG. 4, is made with two separate strap lengths 76, 78 joined by an extensible element 80. While not so limited, the extensible element is shown in the form of a coil spring. Other suitable reconfigurable components, that may or may not incorporate a coil spring, could be readily designed by one skilled in this art. With the coil spring 80 in a relaxed state, the strap 36a has a length substantially equal to that of the horizontal straps 36 thereunder on the part 34.

Figure 3:
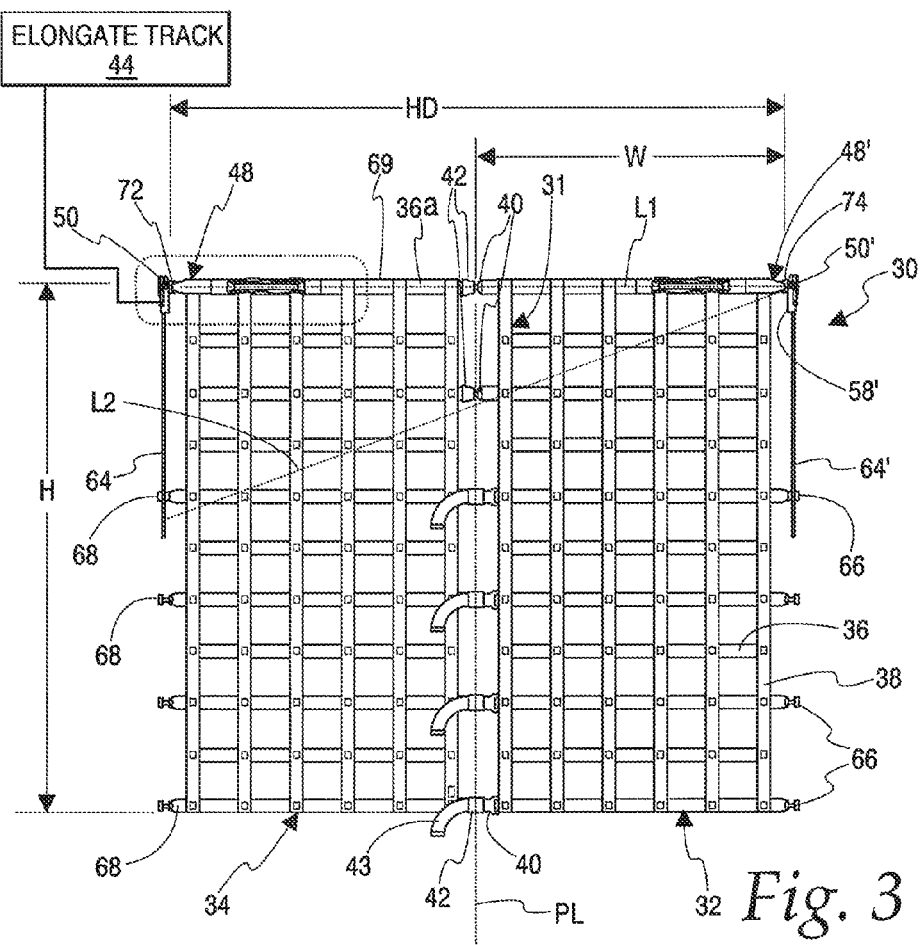
FIG. 3 is an enlarged, end elevation view of the safety net assembly in FIG. 2.

By releasing the shoe 50 through the arm 58 and lowering the shoe 50 from the FIG. 3 position, while maintaining the other shoe 50' both raised and fixed, a line L2, corresponding to the aforementioned first line L1 between the locations 72, 74, is angled from horizontal and has an overall length/dimension between the locations 72, 74 that is greater than the corresponding dimension with the safety net parts 32, 34 in the operative state shown in FIG. 3. In this transition state, the upper hook portions 40, 42 on the strap 36' are lowered to a height wherein they are readily accessible to an operator standing upon the floor 14.

As seen in FIG. 4, the coil spring 80 has hooked ends 82, 84 that can be engaged with D-rings 86, 88 on the strap lengths 76, 78, respectively, to span a distance along the line L1. A cloth sleeve 90 surrounds the coil spring 80 and is extensible lengthwise to accommodate the effective lengthening of the uppermost horizontal strap 36.

A like spring arrangement might be provided on the collapsible part 32 in addition to, or as an alternative to, providing a spring 80 on the part 34.

The described configuration of the safety net assembly 30 allows setup and reconfiguration of the safety net assembly 30 in different manners. With the FIG. 3 arrangement, as an alternative to lowering the shoe 50, the shoe 50' might be lowered on the right side. The line L2 will be tilted oppositely. The coil spring 80 on the part 34 will be accommodate effective lengthening of the upper edge of the safety net 31 regardless of which shoe 50, 50' is lowered, with the other remaining fixed.

As an alternative, two individuals might operate the separate arms 64, 64' to drop the top edge of the safety net 31 while maintaining the top edge thereof substantially horizontal preparatory to reconfiguring the safety net 31, as described above.

Preferably one or both upper locations on the safety net are lowered, preparatory to reconfiguration of the safety net 31, to a height spaced above the floor that allows access to all connections that allow subsequent reconfiguration of the safety net to expose the desired area of the access opening 24. Typically, this lowered but maintained height may be above the floor a distance equal to, or slightly greater than, one half the height of the access opening 24.

The subsequent reconfiguration of the flexible net may involve moving separate net parts away from each other in a widthwise direction, or moving only one net part in a widthwise direction, to a stowed/horizontally compacted state.

To place the collapsible parts 32, 34 in the operative state with both shoes 50, 50' lowered, the hook parts 40, 42 along the entire height of the collapsible parts 32, 34 are mated, whereupon one of the shoes 50, 50' can be directed to its uppermost location. The other shoe 50, 50' can thereafter be raised and locked in place to complete the assembly.

Alternatively, both shoes 50, 50' might be raised together.

Several variations from the above-described structures and methods are also contemplated.

Figure 7:
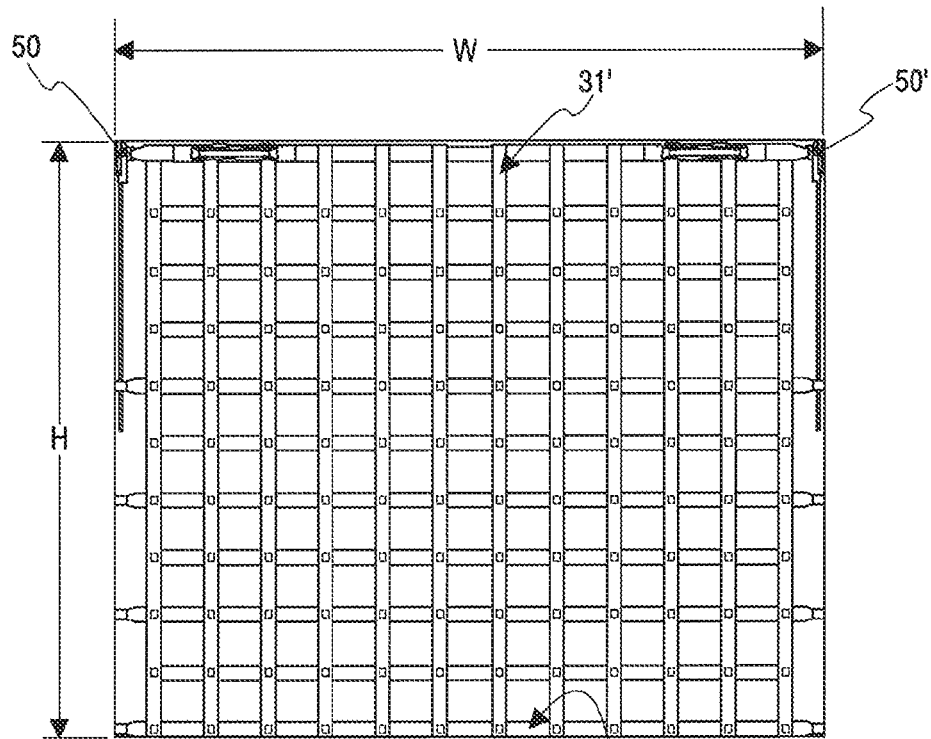
FIG. 7 is a view as in FIG. 3 of a modified form of safety net.

As shown in FIG. 7, a modified form of flexible net at 31' is made as a single piece over the height (H) and width (W) dimensions of the access opening. By lowering one or both upper ends, the net 31' may be released from one or both shoes 50, 50' to facilitate compaction of the net 31'.

In all embodiments, rather than making the safety net 31, 31' to be locally extensible, all, or at least more significant parts of the flexible net 31, 31', than described above, can be made reconfigurable under a sufficiently small force to make the aforementioned operation possible.

Figure 8:
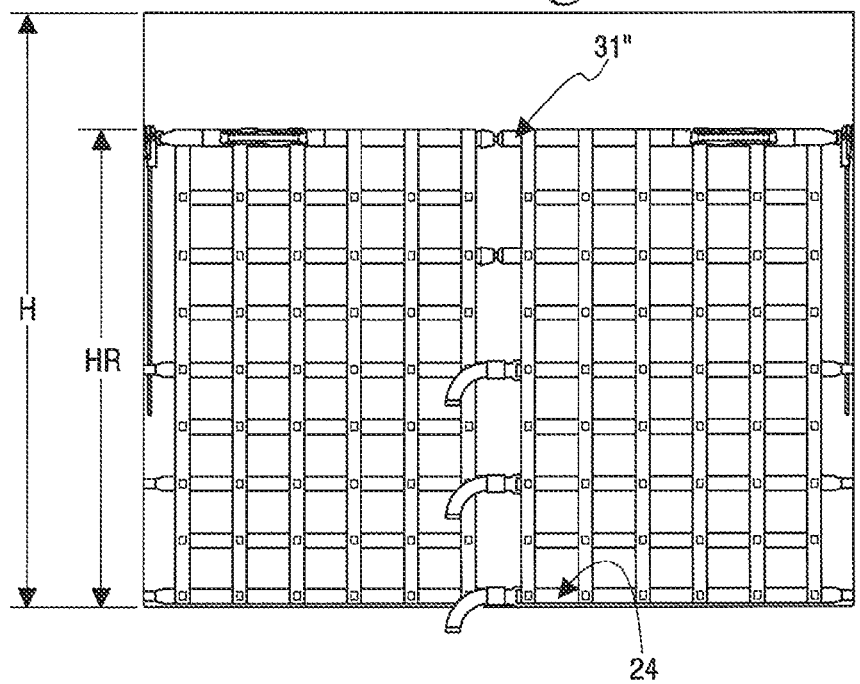
FIG. 8 is a view as in FIG. 7 of a still further modified form of safety net.

In FIG. 8 a further modified form of flexible net is shown at 31". Whereas the above structure is described to cover substantially the entirety of the height and width of the opening 24, the safety net assembly may be designed so that the flexible net 31" has a fully extended reduced height HR that is less than the full height H of the access opening 24. In certain applications, loads may not be stacked fully to the ceiling. Accordingly, a safety net 31" with a reduced height HR less than the full height H is practical.

It is also possible that the cargo container may have a configuration wherein the entire width of the opening 24 need not be blocked by the safety net assembly. The invention contemplates that with the flexible net in its first operative state, the flexible net spans a substantial height and width of the opening 24 to strategically block the opening. That height and width may be dictated by each container design and the particular loading contemplated.

The safety net assembly might be used in like manner at any access opening, such as one provided on front or side walls.

The foregoing disclosure of specific embodiments is intended to be illustrative of the broad concepts comprehended by the invention.

The invention claimed is:

1. A safety net assembly for selectively blocking and exposing an opening in a cargo container having a wall assembly bounding a storage space, the wall assembly comprising: a) a peripheral wall structure with spaced side walls; b) a top wall; and c) a floor, the opening provided in the peripheral wall structure and having a width and a height, the safety net assembly comprising:

a flexible net that is selectively placable in: i) a first operative state wherein the flexible net spans a substantial height and width of the opening to strategically block the opening so as to confine cargo within the storage space; and ii) a second, opened state wherein the opening is exposed to a greater extent than with the flexible net in the first operative state to allow cargo to be directed through the opening into and from the storage space, wherein with the flexible net in the first operative state, the flexible net has a first length between spaced first and second locations on the flexible net that spans a width portion of the opening along a horizontal line at a first height, wherein the flexible net is extensible to allow the first location on the safety net to be lowered while maintaining the second location on the flexible net at the first height so that the line between the first and second locations is angled from horizontal and has a second length between the first and second locations that is greater than the first length as the flexible net is transitioned to the second, opened state, wherein the flexible net comprises at least first and second collapsible parts, with the flexible net in the first operative state the first and second collapsible parts cooperatively span a widthwise extent of the opening and with the flexible net in the second, opened state the first and second collapsible parts are moved away from each other in a widthwise direction relative to the opening, and wherein the safety net assembly further comprises a first elongate track that has a length and is mounted to the peripheral wall structure so that the first elongate track length is aligned in a vertical direction and a first shoe that is guided by the first elongate track and is selectively movable to different locations along the length of the first elongate track, the first location on the flexible net is on the first collapsible part and is connected to the shoe.

2. The safety net assembly according to claim 1 wherein with the flexible net in the first operative state, the first and second collapsible parts cooperatively cover substantially the full height and width of the opening.

3. The safety net assembly according to claim 1 wherein the first elongate track is on a first of two spaced side walls and the second location on the flexible net is on the second collapsible part and is connected to a second of the two spaced side walls.

4. The safety net assembly according to claim 1 wherein the flexible net is locally extensible and the safety net assembly comprises an extensible element on the flexible net that reconfigures to allow the length between the first and second locations to change.

5. The safety net assembly according to claim 4 wherein the extensible element is a coil spring.

6. A safety net assembly for selectively blocking and exposing an opening in a cargo container having a wall assembly bounding a storage space, the wall assembly comprising: a) a peripheral wall structure with spaced side walls; b) a top wall; and c) a floor, the opening provided in the peripheral wall structure and having a width and a height, the safety net assembly comprising:

a flexible net that is selectively placable in: i) a first operative state wherein the flexible net spans a substantial height and width of the opening to strategically block the opening so as to confine cargo within the storage space; and ii) a second, opened state wherein the opening is exposed to a greater extent than with the flexible net in the first operative state to allow cargo to be directed through the opening into and from the storage space, wherein with the flexible net in the first operative state, the flexible net has a first length between spaced first and second locations on the flexible net that spans a width portion of the opening along a horizontal line at a first height, wherein the flexible net is extensible to allow the first location on the safety net to be lowered while maintaining the second location on the flexible net at the first height so that the line between the first and second locations is angled from horizontal and has a second length between the first and second locations that is greater than the first length as the flexible net is transitioned to the second, opened state, wherein the flexible net comprises at least first and second collapsible parts, with the flexible net in the first operative state the first and second collapsible parts cooperatively span a widthwise extent of the opening and with the flexible net in the second, opened state the first and second collapsible parts are moved away from each other in a widthwise direction relative to the opening, and wherein the safety net assembly further comprises a coil spring spanning a distance along the horizontal line on one of the first and second collapsible parts with the flexible net in the first operative state, the coil spring reconfigurable to allow the length between the first and second locations to change.

7. The safety net assembly according to claim 1 wherein the first and second collapsible parts are releasably joined along a vertical parting line.

8. The safety net assembly according to claim 7 wherein the first and second collapsible parts are joined to each other using cooperating hook components.

9. The safety net assembly according to claim 8 wherein the cooperating hook components can be hand connected and separated from each other by a user without requiring tools or separate fasteners.

10. The safety net assembly according to claim 1 wherein the safety net assembly comprises a second elongate track that has a length and is mounted to the peripheral wall structure so that the second elongate track length is aligned in a vertical direction and a second shoe that is guided by the second elongate track and is selectively movable to different locations along the length of the second elongate track, the second location on the flexible net is on the second collapsible part and is connected to the second shoe.

11. The safety net assembly according to claim 10 wherein the first elongate track is on a first of two spaced side walls and the second elongate track is on a second of the two spaced side walls.

12. The safety net assembly according to claim 1 wherein an actuator is provided on the shoe and is movable to thereby change the shoe between locked and unlocked states.

13. The safety net assembly according to claim 12 wherein the actuator comprises an arm that is pivotable around an axis to change the shoe between the locked and unlocked states.

14. The safety net assembly according to claim 13 wherein the arm has an elongate extension rod that depends from the shoe and is graspable by a user and movable to pivot the arm.

15. The safety net assembly according to claim 1 wherein one of the collapsible parts is fixed to the wall structure at a plurality of vertically spaced locations.

16. The safety net assembly according to claim 1 wherein the flexible net comprises a plurality of flexible elongate straps joined together in crossing relationship.

17. The safety net assembly of claim 6, wherein the first and second collapsible parts are releasably joined along a vertical parting line.

18. The safety net assembly according to claim 17 wherein the first and second collapsible parts are joined to each other using cooperating hook components.

19. The safety net assembly according to claim 18 wherein the cooperating hook components can be hand connected and separated from each other by a user without requiring tools or separate fasteners.

20. The safety net assembly according to claim 6 wherein the flexible net comprises a plurality of flexible elongate straps joined together in crossing relationship.

* * * * *